Figure 1:
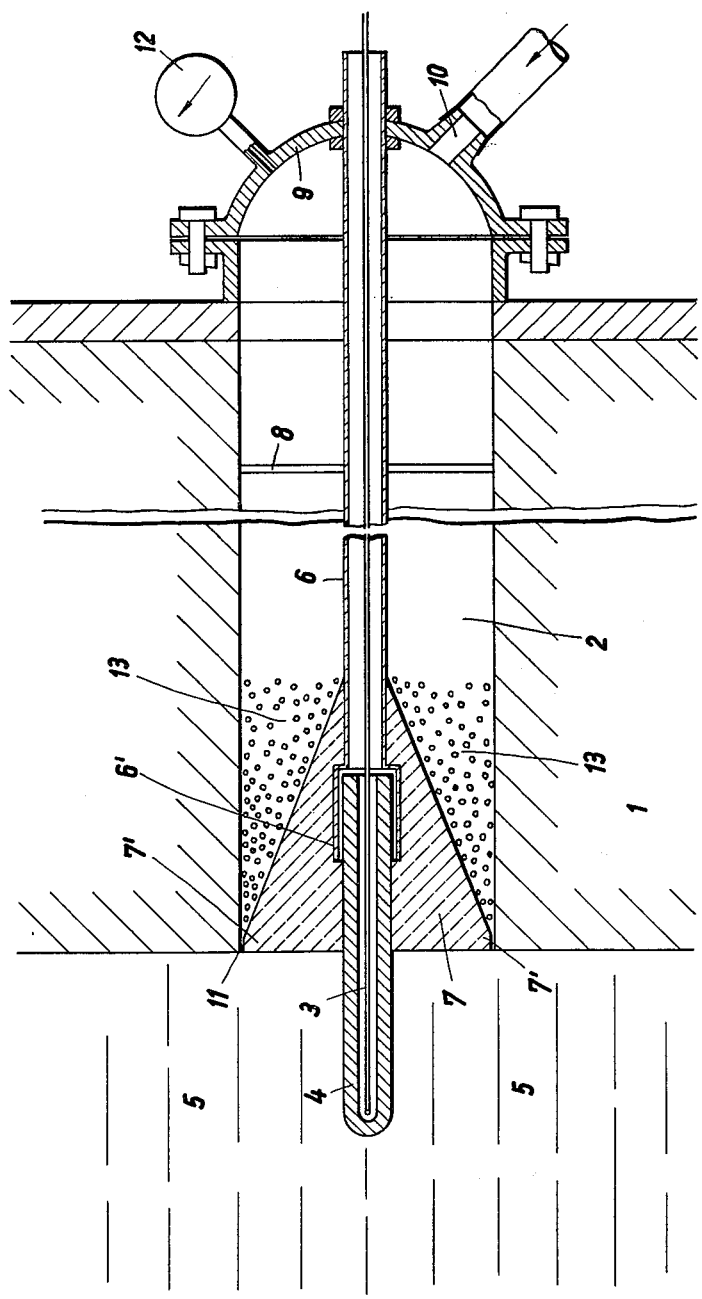

May 28, 1963 W. A. FISCHER ET AL 3,091,119
TEMPERATURE MEASURING APPARATUS
Filed Feb. 5, 1962 4 Sheets-Sheet 3

Inventors
Wilhelm Anton Fischer,
Walter Schütz,
Harald Straube

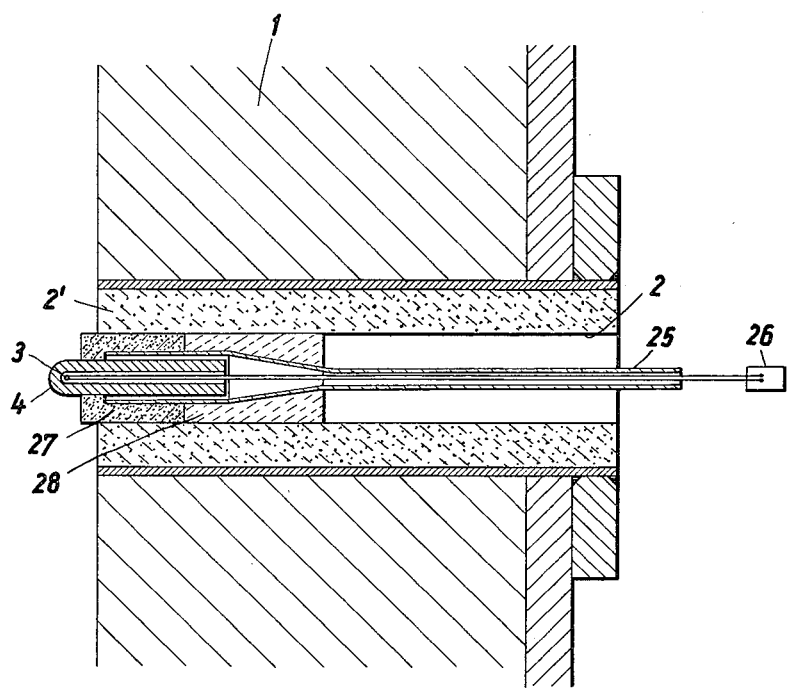

3,091,119
TEMPERATURE MEASURING APPARATUS

Wilhelm Anton Fischer, Ratingen, near Dusseldorf, and Walter Schütz, Baerl, Lower Rhine, Germany, and Harald Straube, Kapfenberg-Steiermark, Austria, assignors to Max-Planck-Institut fur Eisenforschung, a German company, and Phoenix-Rheinrohr Aktiengesellschaft Vereinigte Hutten- und Rohrenwerke, both of Dusseldorf, Germany
Filed Feb. 5, 1962, Ser. No. 171,091
Claims priority, application Germany Feb. 18, 1961
14 Claims. (Cl. 73—343)

The reactions associated with the refining of pig iron in bottom-blown converters or in converters where industrially pure oxygen is injected from the surface of the charge proceed very rapidly, so that considerable skill and experience are required for catching the charge at the time when it has the required composition and quality. A variety of measurement and observation procedures have been devised to obviate this disadvantage. For instance, according to one suggestion an indication as to the correct time to stop blowing is given by spectral observation of the converter flame or by comparing the absorbtivity thereof with monochromatic light of a particular wavelength. Processes of this nature are bound to be unsatisfactory because of the varying conditions of blowing and the varying properties of flame, and similar considerations apply to procedures based on acoustic analysis of the sounds evolved during blowing.

The most reliable one of all the procedures devised for controlling the purifying reactions and the termination thereof, is to continuously measure the charge temperature during blowing. Since the bath temperature is of decisive importance for the metallurgical aspects of the purifying and injection processes, measuring the bath temperature during blowing makes it possible to promptly intervene in the reaction, for instance by cooling the charge with ore and/or scrap, by varying the blowing conditions, and so on.

Continuous measurement of the charge temperature during purifying by means of temperature measuring elements in the form of thermocouples was unsuccessful at first because the ceramic protective tubes were not durable enough. They permitted no more than obtaining a brief dip reading using protective tubes made of quartz, but this required the blowing to be stopped and the converter to be tilted for the measurement. After systematic research had led to the development of much more durable protective tubes—affording the detection of the reaction temperatures of a number of charges—another and far more difficult problem arose when using this method in practice, namely the problem of so introducing the temperature measuring element into the melt in the converter that this element does not disturb the operations while remaining simple and reliable in operation.

According to the present invention, an apparatus for continuously measuring the temperature of iron and steel melts, particularly for purifying pig iron in converters, is provided with a detector head which is introducible into a tubular passage in the masonry of the melt vessel, such passage extending to below the level of the bath when the converter is in the operative position and to above the level of the bath when the converter is in the tilted position. The front end of the detector, to be dipped into the melt, has a refractory ceramic protective tube which jackets a temperature measuring element, e.g. a thermocouple, and the apparatus also comprises a plug of refractory material between the protective tube and the masonry, and means to prevent the plug from becoming sintered to the masonry. According to another feature of the invention, such an apparatus is provided with pathways for gas through the tubular passage terminating at their inner ends over such an area that gas may be injected over at least the periphery of the plug to prevent the plug from becoming sintered to the masonry. The gas pathways terminate at their outer ends in a gas inlet opening in a cover which closes the passage at its outer end. The protective tube is preferably provided with an extension in the form of a pressure-resistant and gas-tight tube which is connected to the plug and which extends from the plug to the cover, and the gas-tight tube encloses the wiring for the temperature measuring element which, in this case, is a thermocouple.

In order to obtain a gas flow over at least the periphery of the plug, a number of different constructions may be employed. In one, the plug is gas impervious and has a diameter somewhat smaller than that of the passage, thereby defining a narrow annular passage for gas between the plug and the masonry. In another construction, the plug is made of gas pervious material and fits the tubular passage. With this arrangement gas is injected over the whole of the inner surface of the plug rather than at its periphery only. In yet a further construction, the plug has a diameter equal to that of the tubular passage and is provided with longitudinal slots forming the inner ends of the pathways for the gas.

When the gas-tight tube mentioned previously is employed, its end in the plug may be widened for the reception and ceramic cementing in it of the open end of the protective tube. Alternatively, the plug and the protective tube can be made of a single piece.

A particularly advantageous embodiment of the apparatus of the invention can be provided if the plug provided between the detector head and the vessel masonry is made of a porous mixture of a highly refractory ceramic substance with a cement and binding agent melting at the temperature of the masonry and with a substance which evolves gas or vapour at such temperature. The plugging composition is introduced—by pouring or pressing or tamping—into the space between the protective tube and the masonry. Preferably, such a gap is not filled up throughout the depth of the masonry, a plug of a length of from about 5 to 10 cm. being satisfactory. Surprisingly, a short porous plug of this kind is strong enough to withstand the pressure of the iron melt and the chemical attacks of the iron melt and slag melt, and yet can readily be removed from the masonry without the latter being damaged.

Suitable as the highly refractory ingredient of the plug mixture are magnesite, burned dolomite, lime, magnesia, corundum, silica or quartz. Preferably, substantially equal proportions of grains of less than 0.06 mm. and grains of 0.12 to 0.25 mm. are used. As waterglass, phosphoric acid or boric acid are suitable as cementing and binding agents fusible at the masonry temperature of about 800 to 1200° C. If such agents are added in the form of aqueous solutions, the water evaporates at the masonry temperature so that the plug assumes the required porosity. Preferably, a 50 to 70% aqueous solution of waterglass, boric acid or phosphoric acid is used and is added in an amount of one-sixth to one-half, preferably one-quarter to one-third of the volume of the refractory substance. If the addition of aqueous solution is slight, the mixture is used as a tamping compound, if the addition of aqueous solution is greater, the mixture is used as a pressing compound, and if the addition of aqueous solution is still greater, the mixture is used as a pouring compound. As additives which give off gas or vapour at the temperature of the masonry there can be used wood chips, granular plastic compositions or other decomposing inorganic or organic compounds, for instance limestone or soda or cellulose or sugar.

If the masonry of the melt vessel is not solid throughout its depth—i.e. there is a chance of the masonry shifting in the course of time as occurs, for instance, with tar dolomite masonry—the passage which receives the temperature detector head and the porous refractory plug should be formed by a highly refractory ceramic tube, or alternatively, such a passage can be formed by using sleeve bricks, for instance of magnesite, which are incorporated in the masonry. If either of these latter expedients is used, the detector head is pushed through the tube or through the sleeve bricks, and the gap remaining between the sleeve bricks or tube and the protective tube is closed with the highly refractory plug. Advantageously, before the temperature detector is introduced into the passage in the vessel masonry, a metal or ceramic disc is provided on the protective tube at a distance of about 1 to 5 cm. from the front end thereof, the external diameter of such disc corresponding to the internal diameter of the passage in the masonry; and after the detector head has been introduced, the space behind the disc can be filled up by the porous highly refractory ceramic plug.

Figure 2:
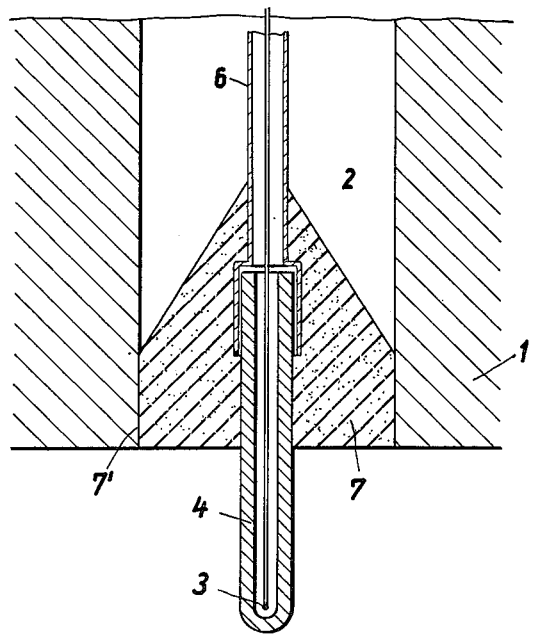
Figure 3:
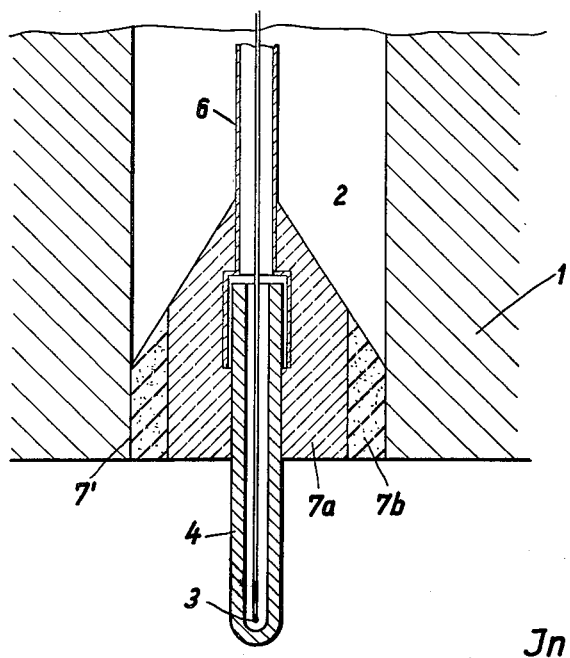
Figure 4:
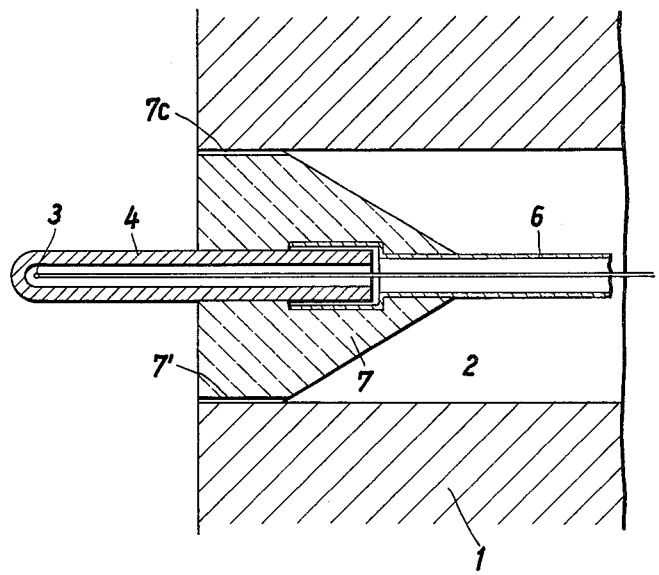
Figure 4A:
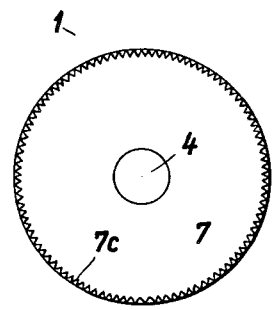

Apparatus according to the invention for thermoelectrical measurement of the temperatures of molten iron and steel, more particularly for purifying of pig iron in converters, are illustrated in the drawings wherein:

FIGURES 1 to 5 are each a longitudinal sectional view through a detector head introduced into the refractory masonry or lining of a refining vessel; and FIG. 4a is a front view of a bearing member which forms part of the head shown in FIG. 4.

Disposed in a lining 1 of a converter is a passage 2 which is lined with a ceramic tube (not shown) and which extends below the surface of the treatment metal when the converter is in the operative position, and to above such surfaces when the converter is in the tilted position. A detector head is introduced into the passage 2. The detector head comprises a protective tube 4 which contains a thermocouple element 3; that portion of the tube 4 which remains in the tubular passage 2 is surrounded by a refractory bearing member 7 which is conical in the embodiment shown in FIG. 1 and which has a cylindrical part 7' for sealing the passage 2 off from the interior of the refining vessel. The external diameter of the cylindrical part 7' is slightly smaller than the internal diameter of the passage 2 by an amount so that there remains a narrow annular passage 11 through which an inert gas, such as argon, can be injected under pressure. As a safety feature in case of damage, the bearing member 7 can be backfilled with a granular highly refractory substance 13, for instance of magnesite or aluminium oxide, defining pathways for gas from the passage 11 to the other end of the passage 2.

Rigidly secured to the bearing member 7 is a tube 6 which is made, for instance of steel and which has a widened end 6'; the open end of the protective member 4 is cemented ceramically into the end 6'. The wiring for the thermocouple element 3 extends through the steel tube 6 which is centered in the radial passage 2 by means of radial arms 8. The tubular passage 2 is hermetically closed off from atmosphere by a cover 9 provided with a connection 10 for supplying the inert gas whose pressure is measured by a pressure gauge 12. The steel tube 6 can either terminate in the cover 9 and be rigidly connected thereto or can extend therethrough. The wiring of the thermocouple element 3 is connected to a millivoltmeter (not shown) which records the bath temperature during the entire refining process.

In the embodiment shown in FIGURE 2, the bearing member 7 is made of a porous and gas-pervious refractory substance, in which event the diameter of the cylindrical part 7' corresponds to the diameter of the passage 2. Good results have been achieved with the detector head which is shown in FIGURE 3 and in which an annular member 7b made of a porous gas-pervious refractory substance is connected to and extends round an impervious ceramic plug 7a, the outer diameter of the cylindrical part 7' corresponding to the diameter of the passage 2.

In the detector head shown in FIGURES 4 and 4a, the periphery of the cylindrical part 7' of the plug or bearing member 7 is formed with longitudinal slots 7c through which the gas can flow, the part 7' having a diameter corresponding to the diameter of the passage 2.

The detector heads as hereinbefore described can readily be replaced between two consecutive charges without the lining of the refining vessels being damaged. To replace a detector head, the bearing member 7 can be pulled out of the passage 2 together with the cover 9 and the steel tube 6 or, after removal of the cover 9 and withdrawal of the thermocouple, can be introduced together with the protective tube 3 into the refining vessel.

In the embodiment illustrated in FIGURE 5, the tubular passage 2 in the masonry 1 is formed by a jacketed highly refractory ceramic tube 2' incorporated in the masonry. The tube 2' is prepared by tamping and sintering a highly refractory composition, for instance, magnesia having a small addition of waterglass. Alternatively, one or more correspondingly shaped sleeve bricks can be used. The temperature detector head is introduced into the resultant passage 2. The detector head comprises the protective tube 4 which surrounds the thermocouple element 3 and which has its rearward part surrounded by an iron tube 25. The tube 25 extends to the exterior through the passage 2 and its external end outside of the converter carries connections 26 for the thermocouple thermo element wiring. Disposed on the thermoelement protective tube 4 at a distance of from about 1–5 cm. the closed front end thereof is a ceramic disc 27 which may extend part of the extension tube 25, as shown. The disc 27, which can be made of the highly refractory porous mixture mentioned below, is tamped onto the detector head before the same is introduced.

After the detector head with the tamped-on disc 27 has been introduced into the passage 2, the remaining gap between the tube 2 and the disc 27, and the space therebehind, is filled up, over a length of about 5 cm., with a plug composition 28. The water of the plug composition evaporates at the temperature of the masonry, whereas the waterglass or phosphoric acid or boric acid will melt and sinter the highly refractory ingredient of the mixture. Thus a porous highly refractory plug is formed which comprises the parts 27 and 28. It has been found that about 100 to 200 cc. of plug composition are required for a 50 ton converter in which the passage 2 has a diameter of 40 mm. Instead of a tamped-on highly refractory disc 27, a thin metal disc can be used on the protective tube 4. Since a thin metal disc is destroyed by the melt when the converter is placed upright, the quantity of plug composition to be filled into the masonry passage after the detector head has been introduced must be increased correspondingly.

To replace the detector head, the thermocouple element 3 is removed from the protective tube 4, whereafter the iron tube 25 is either pulled out of the passage 2 or knocked into the converter whereafter the remainder of the plug composition 27, 28 is cleared out of the tube 2' by a drill. Even after 10 to 20 charges this job can be performed readily and in a very short time. The passage 2 is then ready to receive a new detector head. Only a few minutes are required for complete replacement, so that the converter operation is not disturbed.

If a large proportion of the plug is a tamping compound, it is advisable, because of the low water content of such composition, to add gas-evolving substances of the kind hereinbefore specified, particularly plastics or wood chips, to ensure that the plug is of adequate porosity and therefore readily replaceable. An alternative method of ensuring the required porosity is to give the highly refractory granular mixture a reduced proportion of fines, so that the space between the coarse grains is not entirely filled by fine grains and sintering agent. In this event the sintering agent is added in solid form.

As experiments have shown, the various forms of apparatus described are of use not only for measuring temperatures in steel conversion but also for many other steel melting manufacturing processes and for continuous measurement of temperature of melts in casting ladles.

We claim:

1. Apparatus for continuously measuring the temperature of iron and steel melts, comprising a melt vessel made of masonry and formed therethrough with a tubular passage, a detector head held in said passage, said head having at its front, inner end a refractory ceramic protective tube and also having a temperature measuring element housed within said tube, a plug of refractory material disposed between said tube and said masonry, and means disposed to prevent said plug from becoming sintered to said masonry.

2. Apparatus according to claim 1, said tubular passage having gas pathways terminating at their inner ends over such an area that gas may be injected over at least the periphery of said plug to prevent said plug from becoming sintered to said masonry, the apparatus also comprising a cover closing said tubular passage at its outer end and including a gas inlet opening defining the outer ends of said gas pathways.

3. Apparatus according to claim 2, and including an extension for said protective tube, said extension comprising a pressure-resistant and gas-tight tube connected to said plug and extending from said plug to said cover, the apparatus also including within said gas-tight tube wiring for said temperature-measuring element, said element comprising a thermocouple.

4. Apparatus according to claim 2, said plug being gas impervious and having a diameter smaller than the diameter of said tubular passage, said plug thereby defining an annular passage for gas between said plug and said masonry, the apparatus including refractory gas-pervious material filling said annular passage.

5. Apparatus according to claim 2, said plug being made of gas-pervious material and fitting said tubular passage.

6. Apparatus according to claim 2, said plug having a diameter equal to the diameter of said tubular passage and being formed with longitudinal slots forming the inner ends of said gas pathways.

7. Apparatus according to claim 3, the end of said gas-tight tube disposed in said plug being widened to receive the open end of said protective tube, said gas-tight tube having radial arms which centre said gas-tight tube in said tubular passage.

8. Apparatus according to claim 3, said plug and said protective tube being of one piece construction.

9. Apparatus according to claim 1, said plug being made of a porous mixture, said mixture comprising a highly refractive ceramic substance, a cement and binding agent melting at the temperature of said masonry, and a substance which evolves gas or vapour at said temperature.

10. Apparatus according to claim 9, said mixture being of substantially equal proportions of grains less than 0.06 mm. and of grains of from 0.12 to 0.25 mm. of said highly refractory substance, and a fraction of from one-sixth to one-half of its volume of a 50 to 70% aqueous solution selected from the group comprising waterglass, phosphoric acid and boric acid has been added.

11. Apparatus according to claim 10, said fraction being from one quarter to one third.

12. Apparatus according to claim 10, said refractory ceramic substance being selected from the group comprising magnesite, burned dolomite, lime, magnesia, corundum, silica, and quartz, and said substance which evolves gas or vapour being selected from the group comprising wood chips, grains of plastic compositions, lime stone, soda, cellulose, and sugar.

13. Apparatus according to claim 9, and including a highly refractory ceramic tube introduced into said masonry and defining said tubular passage.

14. Apparatus according to claim 9, and including a disc disposed on said protective tube at a distance of from 1 to 5 cm. from the front end of said tube, the said plug being disposed behind said disc and having a length of from 5 to 10 cm.

No references cited.